United States Patent [19]
Spurgin

[11] Patent Number: 5,887,561
[45] Date of Patent: *Mar. 30, 1999

[54] OIL COOLER FOR A MOTORCYCLE

[76] Inventor: Robert E Spurgin, 8604 Alfano Ct., Las Vegas, Nev. 89117

[*] Notice: The term of this patent shall not extend beyond the expiration date of Pat. No. 5,653,206.

[21] Appl. No.: 864,238

[22] Filed: May 28, 1997

Related U.S. Application Data

[63] Continuation-in-part of Ser. No. 674,719, Jul. 2, 1996, Pat. No. 5,653,206.

[51] Int. Cl.$^6$ ........................................................ F01M 5/00
[52] U.S. Cl. ........................................................ 123/196 AB
[58] Field of Search ........................................ 123/196 AB

[56] References Cited

U.S. PATENT DOCUMENTS

| | | |
|---|---|---|
| 2,281,859 | 5/1942 | Reeves . |
| 2,781,859 | 2/1957 | Warren . |
| 2,824,724 | 2/1958 | Porsche . |
| 4,445,587 | 5/1984 | Hillman . |
| 4,640,341 | 2/1987 | Ozawa . |
| 4,662,470 | 5/1987 | Fujisawa et al. . |
| 4,687,069 | 8/1987 | Inomata et al. . |
| 4,690,236 | 9/1987 | Shinozaki et al. . |
| 4,848,453 | 7/1989 | Evans . |
| 4,902,059 | 2/1990 | Tritton . |
| 4,971,171 | 11/1990 | Yamada et al. . |
| 5,244,036 | 9/1993 | Michl . |
| 5,307,865 | 5/1994 | Inagaki et al. . |
| 5,363,823 | 11/1994 | Gittlein ............................. 123/196 AB |
| 5,653,206 | 8/1997 | Spurgin ............................ 123/196 AB |

FOREIGN PATENT DOCUMENTS

| | | |
|---|---|---|
| 3168316 | 11/1989 | Japan . |
| 709742 | 6/1952 | United Kingdom . |

*Primary Examiner*—John T. Kwon
*Attorney, Agent, or Firm*—Quirk & Tratos

[57] ABSTRACT

A system is set forth for cooling the circulating oil of an air cooled motorcycle engine having an oil pump and a mount for an oil filter, oil from the pump delivered to the filter and from the filter back to the engine for re-circulation. The system includes an oil cooler secured to the motorcycle, which may be a radiator cooler or the engine guard A diverter and an adapter assembly is disposed between the filter and mount and is adapted to direct oil to the cooler, through the cooler for cooling thereof, from the cooler back to the diverter for supply through the adapter assembly to the filter and return to the engine. The adapter assembly is disposed between the diverter and filter for certain model engines to turn the axis of the assembly so that the system can be provided for these engines.

10 Claims, 6 Drawing Sheets

OIL COOLER FOR A MOTORCYCLE

CROSS REFERENCE TO RELATED APPLICATION

This application is a continuation-in-part application of my U.S. patent application Ser. No. 08/674,719 filed Jul. 2, 1996 and titled "Oil Cooler For A Motorcycle" now U.S. Pat. No. 5,653,206.

FIELD OF THE INVENTION

The present invention relates to motorcycles and more particularly to oil coolers for air cooled motorcycle engines.

BACKGROUND OF THE INVENTION

Some types of motorcycles have air cooled engines. Notably, motorcycles manufactured by Harley-Davidson Motorcycle Company of Milwaukee, Wis. have large displacement, four stroke, air cooled engines. As is well known, these engines have an oil pump which circulates oil through the engine to lubricate the components thereof and to carry away the accumulated heat of combustion and friction. Under normal operations for a motorcycle of the type described above having a displacement of 80 cubic inches, the oil pump has a discharge pressure of about 12 to 14 PSI. To assure proper circulation and lubrication, it is important that the pressure be maintained. A significant drop in oil pressure can result in damage to engine components.

As is also well known, engines of the type described have replaceable oil filters which are coupled to the engine by suitable means to filter the oil. Typically a mount having a threaded port is presented to threadably mount the filter. The port has an axial bore through which oil from the filter is returned to the engine for re-circulation by the oil pump. The filter has a threaded center bore such that the filter can be threaded and unthreaded from the port. To supply oil to the filter, disposed about the port are one or more openings through which oil from the engine delivered by the oil pump is supplied to the filter. Hence, the oil is pumped through the engine for a lubrication and heat transfer, from the openings and into the filter. Oil passes through the filtering media of the filter and returns to the crank case through the port axial bore.

With continuing reference to the engine of the type described above, the cooling of the engine is carried about by providing fins on the cylinder block. When the motorcycle is moving, forced convection heat transfer occurs to carry away heat.

In stagnant air flow conditions such as when the motorcycle is stopped and running, and particularly in elevated ambient conditions such as in high heat and humidity, the temperature of the oil may rise to such a level that oil pressure is lost. In those circumstances the operator of the motorcycle must turn off the engine or risk damage thereto. The forgoing is true particularly for police motorcycles of the type described above which may be stopped in traffic or involved in slow moving, stop and go traffic. Under these conditions and in the engines of the type described above, insufficient cooling takes place to maintain oil pressure.

In the past, efforts have been made to provide additional oil cooling. For example, in Michl, U.S. Pat. No. 5,244,036, an oil cooler for motorcycle is shown. With reference to FIG. 1 herein, a motorcycle 10, of the type described above, is generically illustrated. The motorcycle 10 has a front wheel assembly 12 including a front wheel 14 and a front fork suspension 16 as is well known in the art. A rear wheel assembly 18 is also provided, both the front wheel and rear wheel assemblies 12 and 18 coupled to a motorcycle frame 20. An engine 22 provides power for the motorcycle 10. Foot pegs 24 provide a resting place for the operators feet. According to this reference, an oil cooler 26 is attached to the motorcycle frame 20 to follow the inverted V-shape pattern of the front portion of the motorcycle frame 20. This oil cooler is supplied with oil from the discharge of an oil filter 28 positioned between the frame 20 and engine 22 and transversely to the direction of travel for the motorcycle 10. The oil circulates through the oil cooler 26 and is returned to the oil reservoir for the motorcycle.

A drawback of prior oil coolers of the type described above, is that their close proximity to the engine does not provide for efficient cooling of the oil. Heat from the engine 22 transferred to the environment, particularly in stagnant conditions when the motorcycles not moving, will increase ambient temperature conditions about the oil cooler 26 effecting the efficiency thereof.

Furthermore, the oil coolers of the type described above provide no other function than as an oil cooler. It is a component which has no other utility than to operate as an oil cooler.

Still further, the location of the oil cooler 26 described, limits the service area available for cooling in that it is coupled to the frame 20. Still further, debris such as dirt and mud thrown up by the front wheel 14 may effect the heat transfer capabilities of the oil cooler.

It is therefore desirable to provide an oil cooler which overcomes these drawbacks.

Unrelated to oil coolers, and further by way of background, it has been known to provide motorcycles with an engine guard, sometimes referred to as a crash bar, mounted to the motorcycle frame to project to either side of the engine. These engine guards protect the engine components should the motorcycle fall to the side and in such event, may also provide the additional benefit of protecting the rider's legs. For Harley-Davidson motorcycles of the type described above, these engine guards may have an inverted U-shape and may be 80 inches long or more with an outside diameter of 1.25 inches. Typically, these engines guards, for purposes of appearances, have a chrome finish.

Heretofore, the art of oil coolers and engine guards have been unrelated.

SUMMARY OF THE INVENTION

There is provided, therefore, according to the various embodiments of the present invention, as system for cooling oil for an air cooled motorcycle engine of the type like those manufactured by Harley-Davidson Motorcycle Company, which provides the functions of an oil cooler and an engine guard. This system is easy to install, unobtrusive and effective.

Accordingly, there is set forth a system for cooling oil for an air cooled motorcycle engine of the type having an oil pump and oil filter and means for mounting the filter to the engine, the mounting means including an opening to deliver oil from the engine to the filter and a port for receiving oil returning from the filter and returning it to the engine. The system includes a hollow engine guard adapted to be secured to the motorcycle, and more particularly, to its frame. At least a portion, and preferably the entire length of the engine guard, defines a closed chamber having a supply end and a return end.

A diverter is adapted to be disposed between the filter and engine to divert oil discharged from the oil pump and engine to the engine guard inlet for circulation through the chamber and for directing the oil from the engine guard outlet back to the filter for filtering thereof. Accordingly, oil delivered from the engine, after having lubricated components and picked up heat from the engine, is delivered to the engine guard through which it circulates before returning to the filter. From the filter, the oil is returned to the engine for re-circulation by the oil pump. As can be appreciated, the engine guard thereby acts as an oil cooler as well as an engine guard.

According to other embodiments, a thermostat bypass can be provided such that the diversion of oil from the filter to the engine guard only occurs where oil temperatures are above a pre-selected value such as 180 degrees Fahrenheit. Below that temperature, oil delivered from the engine is past by the diverter and delivered to the filter, for filtering, and returned from the filter to the engine. At 180 degrees Fahrenheit or any other preselected value or higher, the oil is diverted to the engine guard for cooling.

In yet a further embodiment, for Harley-Davidson motorcycles of the type described for the model years 1996 or later which are of the fuel injection type, the system, according to the present invention, further includes an angular adapter assembly disposed between the diverter and filter. The adapter assembly is constructed to turn the path of connection of the filter to the engine so as to avoid interference with components provided on these model year motorcycles. In the preferred embodiment of the adapter, the adapter turns the path of connection of the filter 90 degrees such that the filter is connected in a direction to project forwardly of the engine and frame. In this manner, the diverter and filter, with the adapter assembly, may be coupled to these model year motorcycles. As an added feature, with the adapter, filters of larger sizes can be used to increase the oil supply available to the engine.

For more recent versions of Harley-Davidson motorcycles, yet another adapter assembly is provided which provides for coupling of the diverter and filter.

In any embodiment, the adapter assembly and diverter provide for circulation of oil through an oil cooling crashbar or a dedicated oil cooler.

The system, according to the various embodiments of the present invention, provides for not only an engine guard for the engine, but an oil cooler as well. Still further, the system, according to the present invention, increases the supply of oil available to the engine. For certain model years, the system including the adaptor assembly enables larger size filters to be used, further increasing the quantity of oil in the system. Still further, the system provides for the oil cooler to be upstream of the filter such that the filter can remove any debris which may be collected by the oil from the oil cooler.

BRIEF DESCRIPTION OF THE DRAWINGS

These and other features and advantages will become appreciated as the same becomes better understood with reference to the specification claims and drawings wherein:

DETAILED DESCRIPTION OF THE PREFERRED EMBODIMENT

Figure 2:
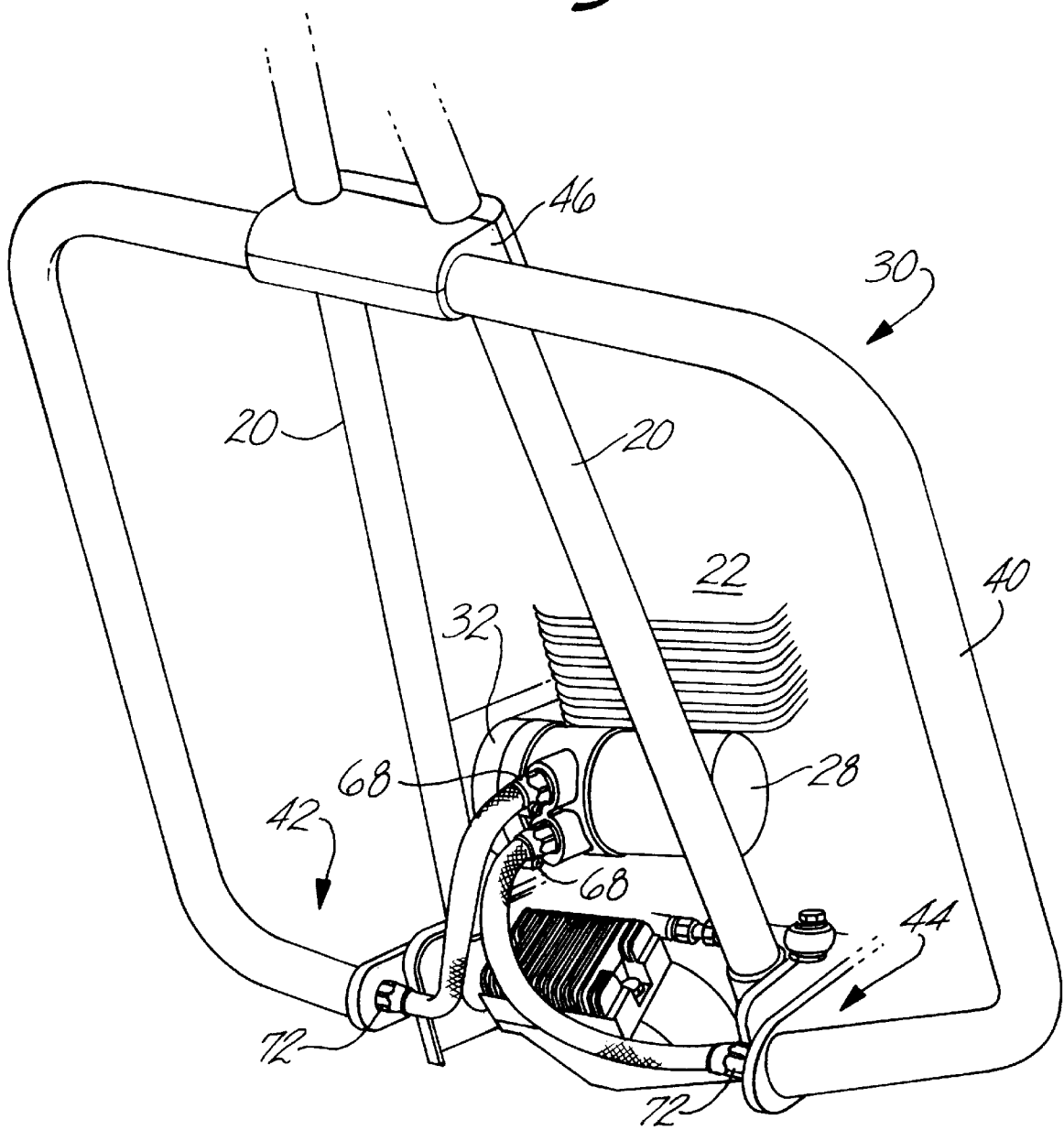
FIG. 2 is a perspective front view of one embodiment of the system according to the present invention.

Turning to FIG. 2, one embodiment of a system 30 for employment with an air cooled motorcycle 10 of the type described above is shown. For purposes of clarity, only a portion of the engine 22 is shown.

Figure 1:
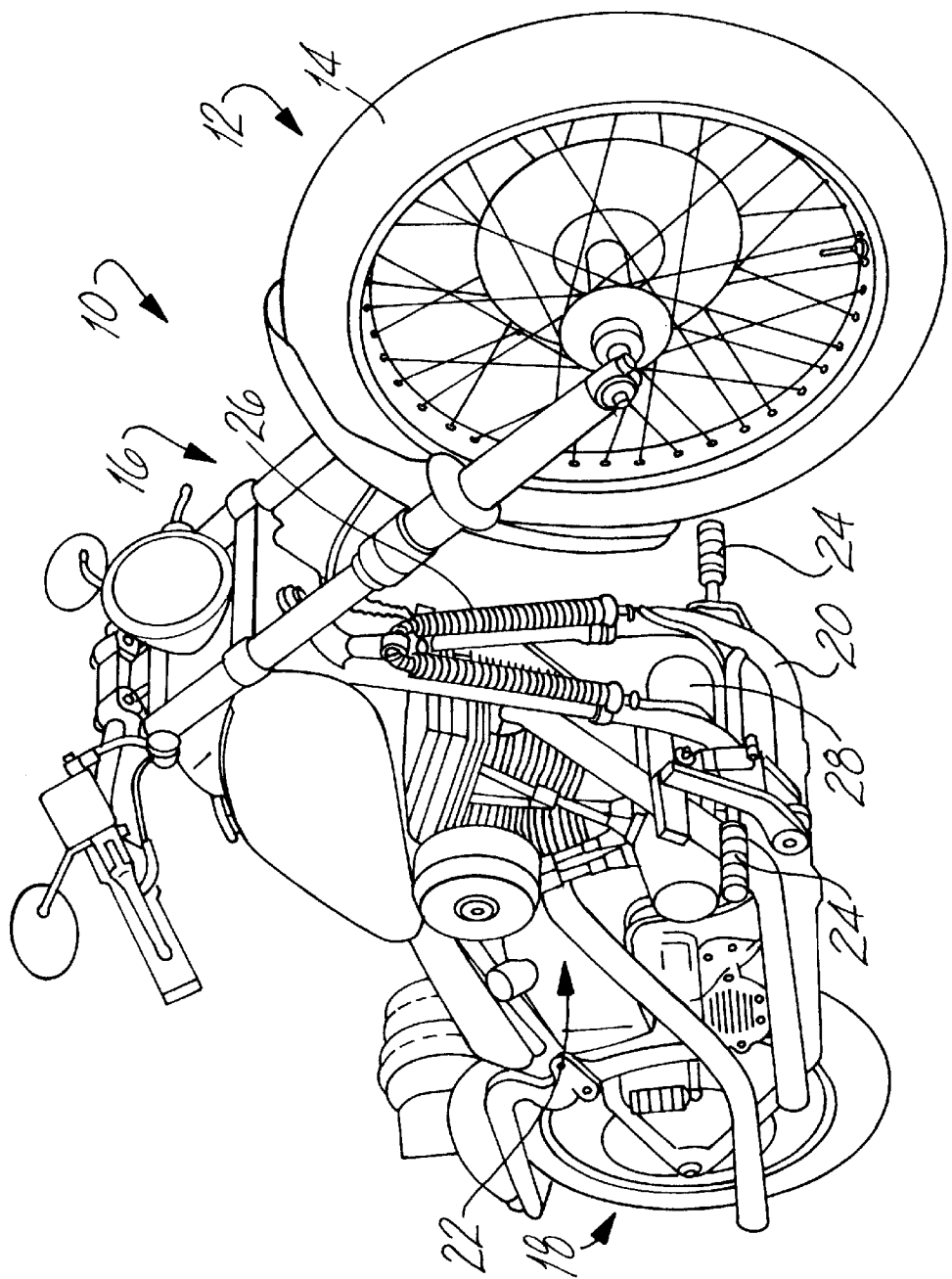
FIG. 1 is a front-side perspective view of a motorcycle having mounting thereon an oil cooler according to the prior art.
Figure 3:
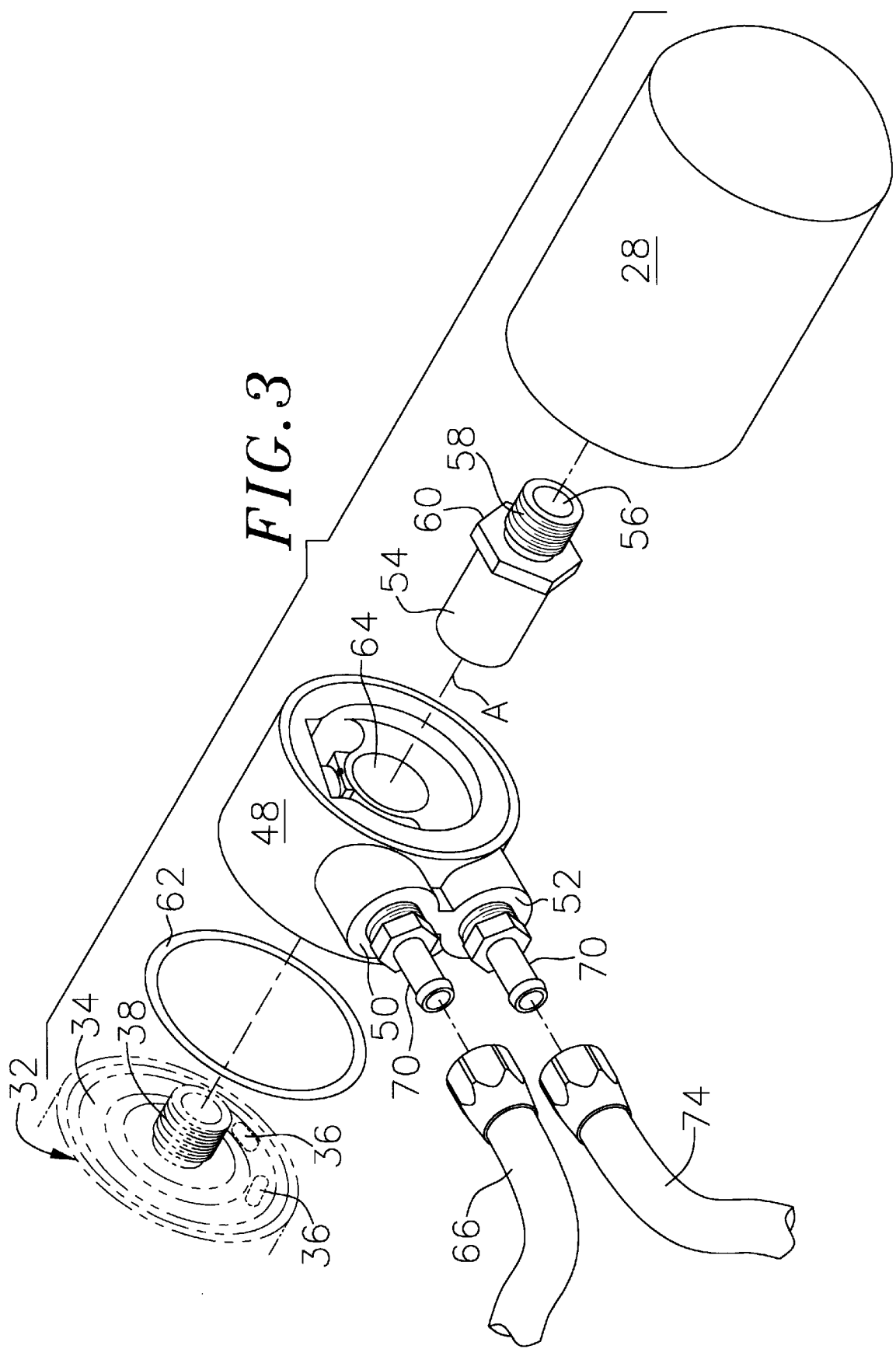
FIG. 3 is an exploded view of a portion of the system of FIG. 2.

For Harley-Davidson Motorcycles of the type having a displacement of 80 cubic inches and for the model years 1992 through 1996, the system 30 for oil cooling is provided. For these model years, the engine includes an oil filter mount 32 adapted to mount an oil filter 28 in an axially aligned direction transverse to the direction of travel for the motorcycle. That is, as shown in FIG. 1, the oil filter 28 is disposed horizontally in front of the engine to extend transversely to the direction of travel for the motorcycle. With reference to FIG. 3, the mount 32 presents a circular face 34 having at least one and typically a plurality of annularly disposed supply openings 36 and an axially disposed, externally threaded oil return port 38. As is known in the art, the oil filter 28 includes an axial, threaded center bore adapted to thready receive to the return port 38 and a plurality of annularly disposed filter openings (not shown) which, when the filter 28 is mounted to the mount 32, are in communication with the supply openings 36. Oil from the motorcycle oil pump is circulated through the engine to lubricate parts and remove heat and is supplied through the supply openings 36 to the filter openings of the replaceable oil filter 28. The oil supplied to the filter 28 passes through filtering media contained therein and is discharged from the oil filter 28 through the axial center bore and return port 38 back to the engine to resupply the oil pump. To provide a seal between the oil filter 28 and the mount 32, the oil filter 28 has an elastomer gasket (not shown).

To provide additional cooling for the oil, according to this embodiment of the present invention, the motorcycle is provided with a engine guard 40, secured to the motorcycle frame 20, to project to either side of the engine 22 ahead of the foot pegs 24 (FIG. 1), to provide protection to the engine components should the motorcycle tip over. The engine guard 40 has an inverted U-shape with a first end 42 and a second end 44 secured to the frame 20 by suitable fasteners (not shown). As described above, the engine guard 40 may have a total length from the first end 42 to the second end 44 of about 80 inches and an outside diameter of approximately 1.25 inches. For appearances, it may have a chrome finish. Opposite the first and second ends 42 and 44, a bracket 46 couples the engine guard 40 to the frame 20.

The engine guard 40 is hollow to define a chamber therein which may be coextensive with the engine guard extending from the first end 42 to the second end 44 or it may, unpreferably, be defined by only a portion of the engine guard 40. At the first end 42 is defined a supply for the chamber and at the second end 44 is a discharge.

With continuing reference to FIGS. 2 and 3, to cooperate with the engine guard 40, the system 30, according to the present invention, includes a diverter 48 disposed between the filter 28 and filter mount 32. Preferably the diverter is of the type manufactured by Hayden, Inc., of Corona, Calif. and supplied with its model 205 adapter kit. The diverter 48 is coupled between the filter 28 and mount 32 and includes a first channel communicating with the mount supply openings 36 and adapted to supply oil delivered therefrom to a diverter outlet 50. A second channel within the diverter 48 is adapted to provide communication between a diverter inlet 52 and the supply openings for the filter 28.

To secure the diverter 48 to the mount 32, a mounting nut 54 is provided. The mounting nut 54 has an axial through bore 56 and at one end, a threaded female fitting to be threadably coupled to the return port 38. At the other end, the nut 54 has a threaded head 58 to threadably mount the filter 28 in the manner described above. Accordingly, the oil supplied to the diverter 48 at the inlet 52 is supplied to the filter 28 and the oil is returned through the nut 54 and return port 38 to the engine. As illustrated in FIG. 3, the nut 54 has a hexagonal flange 60 adapted to clamp the diverter 48 to the mount 32 in the manner described above.

To provide a seal between the diverter 48 and mount 32, an elastomeric ring 62 is disposed between the mount 32 and diverter 48.

Accordingly, to secure the diverter 48 to the mount 32, the ring 62 is disposed to mate with a corresponding annular seat of the diverter 48. The filter 28 is removed from the mount 32 and the diverter 48, with its ring 62, is placed against the mount 32. Thereafter the nut 54 is inserted through a center bore 64 of the diverter 48 and is threaded over the return port 38. The nut 54 is tightened such that the flange 60 forcibly clamps the diverter 48 to the mount 32. Thereafter the filter 28 is threaded to the head 58 to be coupled to the diverter 48. As can be appreciated, and with reference to FIG. 3, the system 30 according to the embodiment provides an assembly line A to couple the filter 28 to the mount 32 in axial alignment. For Harley-Davidson Motorcycle engines of the type described for the model years 1992 through 1996, there is sufficient space to accommodate the increased axial length of the assembly of the system 30 by virtue of the interposition of the diverter 48 between the mount 32 and filter 28.

The diverter outlet 50 is connected to the chamber supply at the first end 42 by a supply conduit 66. At the diverter outlet 50, the supply conduit 66 is connected by passing it over the outlet 50 and using a suitable hose clamp 68 which constricts the supply conduit 66 into an annular recess 70 at the outlet 50. At the other end, the supply conduit 66 is threadably coupled to a threaded supply fitting (not shown) at the first end 42. The supply conduit 66 at this end includes a threaded connector 72 to threadably and suitably connect the supply conduit 66 to the engine guard first end 42.

Similarly, the diverter inlet 52 is put into communication with the engine guard chamber by a return conduit 74. At the diverter inlet 52, the return conduit 74 is connected by a suitable hose clamp 68 which constricts the return conduit 74 into a recess 70 and at the other end by a threaded connector 72 to threadably attached it to a return fitting (not shown) at the engine guard second end 44. The first and second conduits 66 and 74 are preferably embodied as stainless steel braided hoses providing for flexibility of the connection as hereinabove described and for cooperating with the chrome surface of the engine guard 40 for a pleasing appearance.

With the system 30 according to the present invention embodied by the diverter 48 and engine guard 40 as hereinabove described, the operation of the system 30 can be appreciated. Oil supplied from the engine 22 which heretofore had previously been supplied directly to the filter 28, is diverted by the diverter 48 to the outlet 50, through the supply conduit 66 and into the chamber of the engine guard 40 at the first end 42. Oil, under the head provided by the oil pump of the engine 22, directed around and through the chamber of the engine guard 40 for discharge from the chamber discharge at the second end 44. From there, it flows through the return conduit 74 into the diverter inlet 52 and from there to the filter supply. After having passed through the filter media of the filters 28, the oil, having been cooled by the engine guard 40 and filtered by the media of the filter 28, is returned through the nut bore 56 and return port 38 to the engine.

To provide for thermostatic control of circulation of oil through the engine guard 40 for cooling thereof, the diverter 48 is also provided with the thermostat. Below a preselected temperature such as 180 degrees Fahrenheit, the thermostat is in an open condition whereupon oil discharged from the supply openings 36 is circulated from the first channel into the second channel of the diverter 48 and from there, directly to the filter 28. Accordingly, at these lower temperatures, oil is not circulated through the engine guard 40 enabling the engine, by circulation of the oil, to warm-up sooner. At temperatures above 180 degrees Fahrenheit, the thermostat closes to divert the oil to circulate through the engine guard 40.

Oil circulating through the engine guard 40 is cooled thereby. The engine guard 40 is spaced from the engine 20 and therefore, it is believed, provides greater cooling effect. Furthermore, the engine guard 40 has a large surface area providing for cooling of the oil. Also, use of the engine guard 40 as an oil cooler provides an oil cooler which also functions as an engine guard. Further, if there is any debris in the engine guard 40, by putting it upstream of the filter 28, any such debris is filtered prior to the oil returning to the engine.

Figure 4:
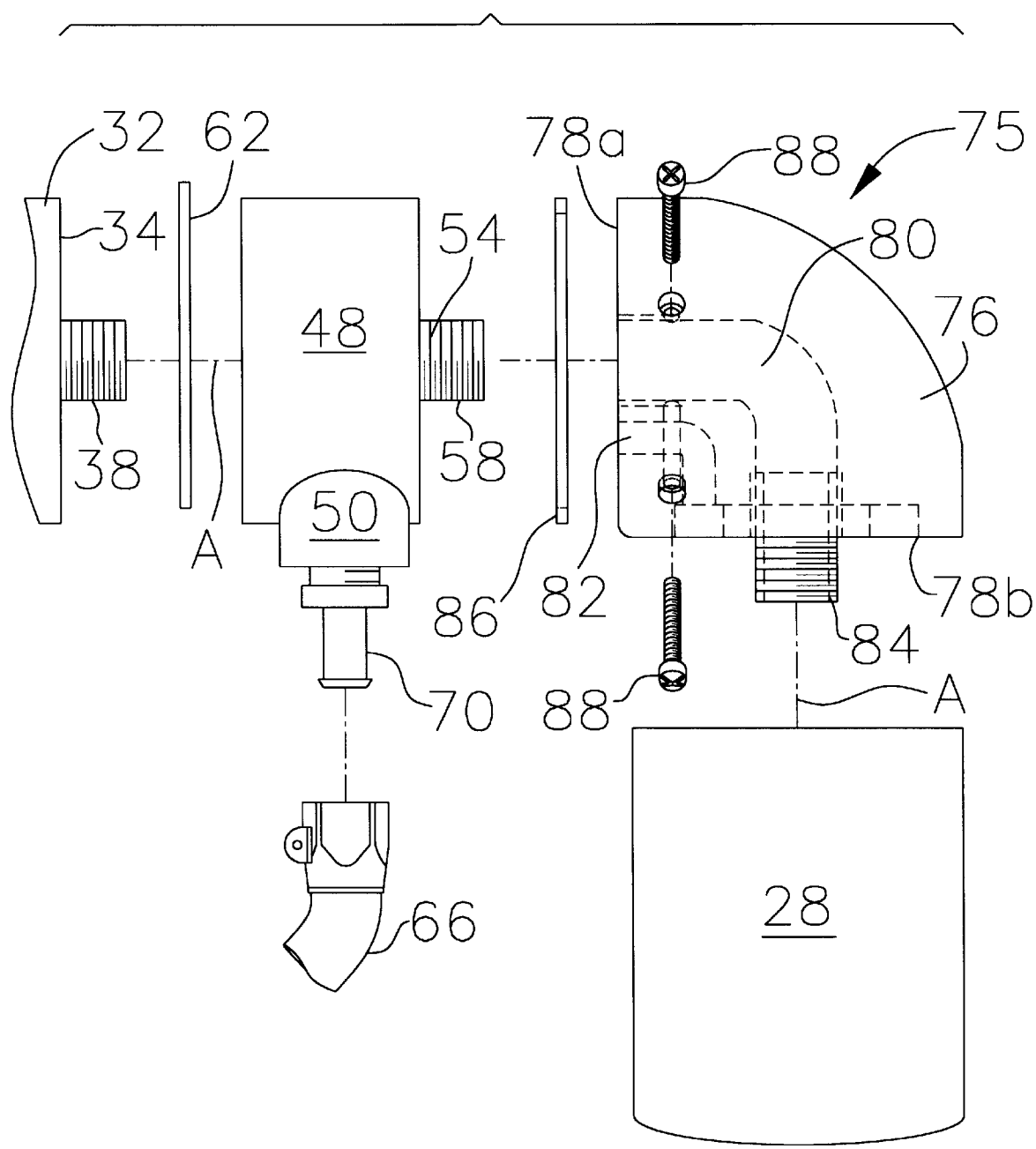
FIG. 4 is a top assembly view of a portion of a further embodiment of the present invention.

With reference to FIG. 4, another embodiment of the present invention is shown. This embodiment is particularly adapted for later model years Harley Davidson engines of the type described above, in that those engines are fuel injected. The fuel injected engines have components which do not permit for the axial length of the assembly of FIG. 3 between the mount 32 and the remote end of the filter 28 to fit within the space provided. Applying the system of FIG. 3 to these particular motorcycles is not possible due to the interference which would occur between the filter 28 and these components.

Accordingly, the embodiment of FIG. 4 includes the diverter 48 of the type described above and an adapter assembly 75 including an adapter 76 disposed between the diverter 48 and the filter 28. The adapter 76, as shown in FIG. 4, turns the axis A of the assembly approximately 90 degrees to, with reference to FIG. 1, extend the filter 28 forwardly of the engine 22 and away from the interfering components of the engine 22. The adapter 76 has a circular cross section having orthogonaly arranged circular surfaces 78a,b. The surfaces are planar, with surface 78a adapted to mate with the diverter 48, and surface 78b adapted to mate with the filter 28. A passageway is defined by an orthoganal bore 80 adapted to provide communication between the nut 54 and return port 38 and the discharge center bore of the oil filter 28. Similarly, and off-center, orthogonal channel 82 is adapted to provide communication with the diverter inlet 52 and the supply openings of the oil filter 28. As shown in FIG. 4, in this embodiment of the system, according to the present invention, the head 58 of the nut 54 need not be threaded, but can be smooth. At the surface 78b, an externally threaded, hollow post 84 is secured coaxially with the bore 80 at the surface 78 to mount the filter 28 thereto.

To assemble the system, according to the embodiment of FIG. 4, the diverter 38 is secured to the mount 32 in the manner described above. Thereafter, an o-ring 86 is disposed between the adapter surface 78*a* and diverter 48 and the adapter 76 is positioned to mate its surface 78*a* with the diverter 48. In this position, the head 58 is inserted into the bore 80 and is closely received thereby. Set screws 88 are radially threaded through the adapter 76 to engage the head 58 to couple the adapter 76 to the head 58. Thereafter, the oil filter 28 is threadably mounted to post 84 and the supply and return conduits 66 and 74 are connected in the manner described above. In this fashion, oil returning from the engine guard 40 is directed through the channel 82 to the supply openings for the oil filter 28. Oil, having passed through the filter media of the oil filter 28, is returned to the engine through the passageway defined by the post 84, orthogonal bore 80, nut 54 and return port 38. By virtue of the adapter 76, the system 30, according to the present invention, may be used on later model engines of the type in which components may interfere with the arrangement shown in FIGS. 2 and 3.

As a further advantage, the system according to FIG. 4, enables various sizes of oil filters 28 to be used. For example, in the model years of 1996 and later, relatively small oil filters are used because of potential interference with other components. Use of larger filters is precluded due to the lack of space. With the system of FIG. 4, and by virtue of turning the axis of the assembly 90 degrees to direct the filter connection forward, larger sizes of oil filters 28 can be used. Larger oil filters provide for the retention of a greater quantity of oil in the system to the benefits described above.

Figure 5:
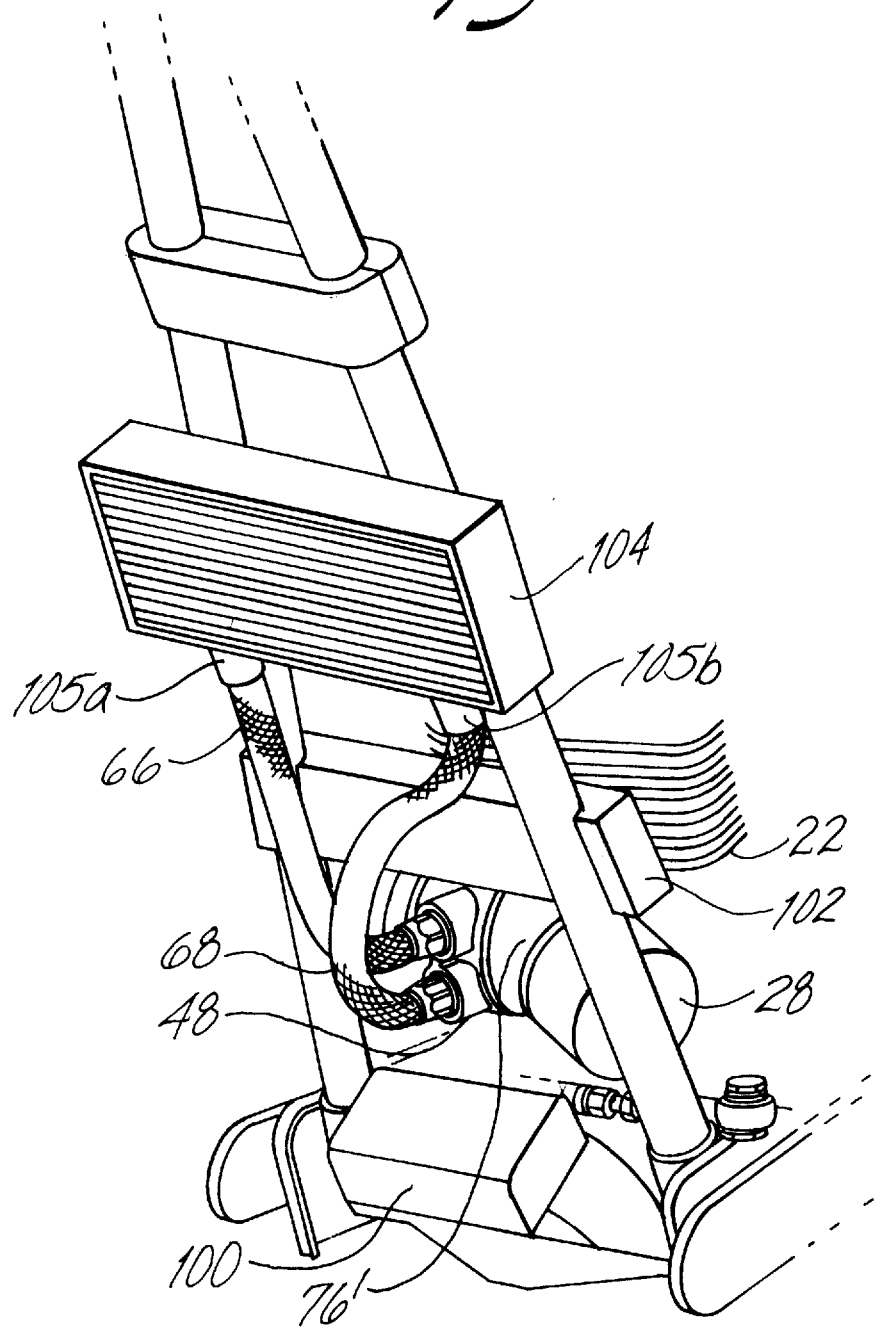
FIG. 5 is a front perspective view illustrating a portion of a recent version of a motorcycle with an oil cooler and the system of the present invention.
Figure 6:
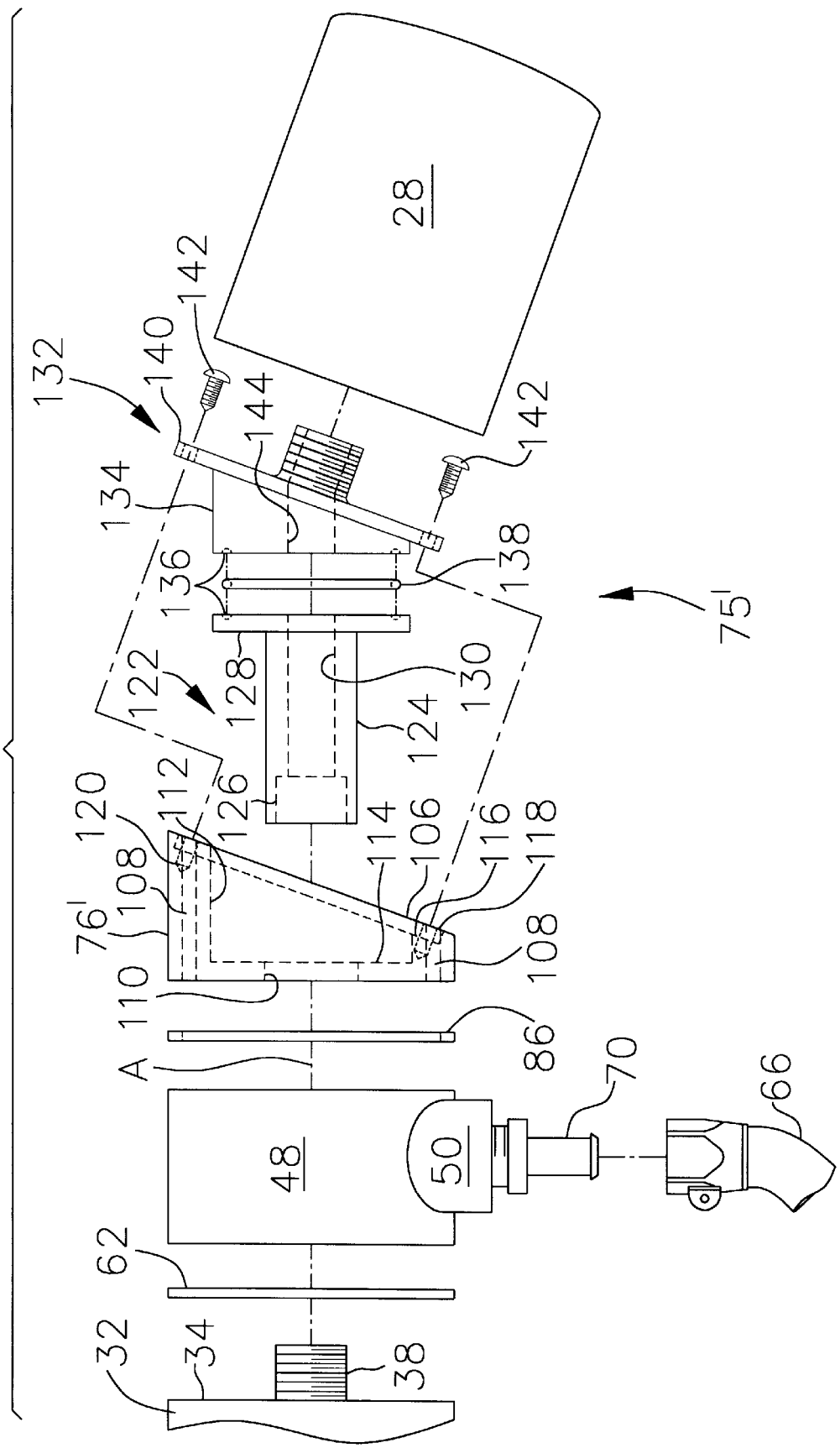
FIG. 6 is an exploded assembly view of a portion of the system illustrated in FIG. 5.

Turning to FIGS. 5 and 6 yet another aspect of the present invention is shown. Like components carry like reference numbers.

For some current models of motorcycles of the type described above, the presence of components of the motorcycle will not accommodate either the straight-line or orthogonal arrangement of the assembly described above. In particular, certain 1997 model year Harley-Davidson motorcycles, as suggested in FIG. 5, have a voltage regulator heat sink 100 and electrical box 102 as well as a crank position sensor (not shown) which prevent use of the systems described above. Accordingly, the system 30 needs to be modified accordingly.

Turning to FIG. 6, the modified system 30' is shown to accommodate use of an engine guard 40 as an oil cooler as described above or a radiator oil cooler 104.

To the circular face 34 of the oil filter mount 32 is positioned a ring 62 and the diverter 48 of the type described above. The diverter 48 has the inlet 52 and outlet 50, also as described above. As shown in FIG. 3, a supply conduit 66 and return conduit 74 are connected to the diverter 48 to supply and return of oil for cooling to the engine guard 40 or, alternatively, to a dedicated oil cooler 104 (FIG. 5). Oil cooler 104 has an inlet 105*a* and an outlet 105*b*. A thermostat is included in the diverter 48 to divert oil to the cooler when it reaches the aforesaid predetermined temperature.

With reference to FIG. 6, to accommodate the space restrictions imposed by the motorcycle, the system 30' according to this embodiment includes an adapter assembly 75' including an adapter 76'. The adapter 76' is cylindrical to mate with the diverter 48 and has a face 106 fashioned at approximately 20 degrees with respect to the axis A of the adapter 76'. As will become appreciated, the 20 degree angle defined by the face 106 will enable the system 30' to accommodate the diverter 48 and filter 28.

The adapter 76' has a plurality of bores 108 which are located near the perimeter of the adapter 76' and extend axially therethrough. Bores 108 conduct oil from the diverter 48 to the filter 28 for filtering thereof. The adapter 76' also includes an axial bore 110 which opens into a larger diameter axial countersink 112 defining an annular shoulder 114. Also fashioned in the face 106 is a larger diameter recess 116 defining at the face 106 an annular seat 118. Threaded bores 120 are tapped into the seat 118 at spaced locations. The threaded bores 120 are disposed along the same oval as are the bores 108 but are spaced therefrom.

To secure the adapter 76' and diverter 48 to the filter mount 32, the assembly 75' includes a mounting bolt 122 is provided. The bolt 122 has a shank 124 adapted to closely pass through the adapter bore 110 and diverter 48 for threading of its end to the threaded return port 38. Accordingly the shank 124 has an axial, threaded bore 126 at its end to be threadably received over the return port 38. The bolt 122 has a head 128 which is tightened against the shoulder 114 to securely couple the adapter 76' and diverter 48 to the oil filter mount 32. The bolt 122 further includes an axial throughbore 130 to pass oil between the filter 28 and the return port 38.

To mount the filter 28, the assembly 75' includes a filter mounting insert 132 having at one end a cylindrical base 134 adapter to closely mate into the countersink 112 above the bolt head 128. To form a seal, the bolt head 128 and insert base include mating annular grooves 136 accommodating a sealing, elastomeric ring 138. The base 134 terminates at a flange 140 which is adapted to be closely received into the recess 116. Threaded fasteners 142 are passed through the flange 140 into the bores 120 to secure the insert 132 to the adapter 76'. Between the fasteners 142 and the holes therefor are bores (not shown) which register with the bores 108 of the adapter 76'.

To mount the filter 28 the insert has a threaded post 84. An angled throughbore 144 passes through the post 84 and insert 132 to define a passageway to return oil for the filter 28 through the insert 132 and bolt 122 to the oil return port 38. Oil is supplied to the filter 28 from the diverter 48, through the bores 108 to the filter 28.

The system 30' including the adapter assembly 75' enables the diverter 48 to be provided for supplying oil for cooling to the engine guard 40 as shown in FIG. 2 or to an oil cooler 104 mounted to the motorcycle frame.

While I have shown and described certain embodiments of the present invention, it is to be understood that it is subject to many modification without departing from the spirit or the scope of the claims set forth herein.

I claim:

1. In an air-cooled motorcycle engine having an oil pump and means for mounting an oil filter, said mounting means directing oil from the pump to the filter and from the filter to the engine, an improvement comprising:

an oil cooler disposed on the motorcycle, said cooler having an inlet and an outlet;

means for diverting oil discharged from the pump to the oil cooler inlet for circulation through the cooler and for directing the oil from the cooler outlet to the filter, said diverting means disposed between said mounting means and said filter, said oil cooler providing cooling of the oil circulating therethrough; and an adapter assembly adapted to be disposed between the diverter and filter to mount the filter, said assembly including a passageway to communicate oil from the filter to the engine and a channel to communicate oil from said diverter to the filter for filtering thereof and said assembly arranged to mount the filter at an angle relative to the mount.

2. The system of claim 1 wherein the oil cooler is a hollow engine guard.

3. The system of claim 1 further including means responsive to temperature to bypass the cooler to direct oil from the engine through the adapter to the filter.

4. The system of claim 3 wherein the bypassing means includes means for bypassing the cooler below a preselected temperature, said bypassing means for temperatures above the preselected temperature diverting oil to the cooler for cooling thereof.

5. The system of claim 4 wherein the preselected temperature is approximately 180 degrees Fahrenheit.

6. The system of claim 1 wherein the adapter assembly includes an adapter to mount the filter orthogonally relative to the mounting means.

7. The system of claim 1 wherein the adapter assembly includes an adapter to mount the filter at approximately 20 degrees relative to the mounting means.

8. The system of claim 7 wherein the mounting means defines an axis for the mount, said adapter assembly includes an adapter to turn the axis approximately 20 degrees, a bolt to couple the adapter and diverter to the mounting means and an insert including a post for threadably mounting the filter.

9. In an air-cooled motorcycle engine having an oil pump and means for mounting an oil filter, said mounting means directing oil from the pump to the filter and from the filter to the engine, said mounting means defining an axis for mounting of the filter, an improvement comprising:

an oil cooler disposed on the motorcycle, said cooler having an inlet and an outlet;

means for diverting oil discharged from the pump to the oil cooler inlet for circulation through the cooler and for directing the oil from the cooler outlet to the filter, said diverting means disposed between said mounting means and said filter, said oil cooler providing cooling of the oil circulating therethrough; and an adapter assembly adapted to be disposed between the diverter and filter to turn said axis and to mount the filter, said assembly including a passageway to communicate oil from the filter to the engine and a channel to communicate oil from said diverter to the filter for filtering thereof and said assembly arranged to mount the filter at an angle relative to the mount.

10. The system of claim 9 wherein said adapter assembly includes an adapter to turn the axis approximately 20 degrees, a bolt to couple the adapter and diverter to the mounting means and an insert including a post for threadably mounting the filter.

\* \* \* \* \*